United States Patent
Naccache

(10) Patent No.: US 8,106,771 B2
(45) Date of Patent: Jan. 31, 2012

(54) TRACEABILITY METHOD FOR AN ELECTRONIC PAYMENT TERMINAL IN THE EVENT OF A THEFT THEREOF, AND CORRESPONDING COMPUTER PROGRAM

(75) Inventor: David Naccache, Paris (FR)

(73) Assignee: Compagnie Industrielle et Financiere d'Ingenierie "Ingenico", Neuilly Sur Seine (FR)

( * ) Notice: Subject to any disclaimer, the term of this patent is extended or adjusted under 35 U.S.C. 154(b) by 368 days.

(21) Appl. No.: 12/370,247

(22) Filed: Feb. 12, 2009

(65) Prior Publication Data

US 2009/0207021 A1    Aug. 20, 2009

(30) Foreign Application Priority Data

Feb. 12, 2008   (FR) ...................... 08 50887

(51) Int. Cl.
  *G08B 13/00* (2006.01)
(52) U.S. Cl. ........... 340/568.1; 340/539.13; 340/539.23; 340/3.31; 340/5.8; 340/8.1; 455/41.2; 455/456.6; 705/17; 702/187; 726/35
(58) Field of Classification Search ............ 340/539.11, 340/539.13, 539.15, 539.2, 539.23, 539.32, 340/568.1, 571, 572.1, 573.4, 825.49, 8.1; 455/41.2, 435.1, 456.1–457; 705/16, 17, 705/40; 726/35
See application file for complete search history.

(56) References Cited

U.S. PATENT DOCUMENTS

| | | | | |
|---|---|---|---|---|
| 5,539,665 A | * | 7/1996 | Lamming et al. | ............. 709/224 |
| 5,754,655 A | * | 5/1998 | Hughes et al. | ................... 705/70 |
| 6,300,863 B1 | * | 10/2001 | Cotichini et al. | ............... 340/5.8 |
| 6,873,259 B2 | * | 3/2005 | Teraura | ...................... 340/572.1 |
| 6,989,753 B1 | * | 1/2006 | Lamming et al. | .......... 340/573.1 |
| 7,075,433 B2 | * | 7/2006 | Singer | ........................ 340/568.1 |
| 7,242,306 B2 | * | 7/2007 | Wildman et al. | .......... 340/573.1 |
| 7,421,589 B2 | * | 9/2008 | Williams et al. | ............... 713/193 |
| 2004/0167820 A1 | * | 8/2004 | Melick et al. | .................... 705/16 |
| 2004/0203769 A1 | | 10/2004 | Sakanaba | |
| 2006/0125634 A1 | * | 6/2006 | Schreyer | .................... 340/568.1 |
| 2006/0232398 A1 | * | 10/2006 | Nedblake et al. | ........ 340/539.13 |

FOREIGN PATENT DOCUMENTS

WO    03081551 A1    10/2003
WO    2004036520 A1    4/2004

OTHER PUBLICATIONS

French Search Report corresponding with French Application No. 08/50887, filed Feb. 12, 2008.

* cited by examiner

*Primary Examiner* — George Bugg
*Assistant Examiner* — Anne Lai
(74) *Attorney, Agent, or Firm* — David D. Brush; Westman, Champlin & Kelly, P.A.

(57) ABSTRACT

A traceability method is provided for an electronic payment terminal, in the event of a theft thereof. The method includes the following steps: detection of a lack of contact with a base and/or another terminal associated with the terminal, for a predetermined time span, generating a passage of the terminal into a stolen state; and in the stolen state, storage, in a secure memory area of the terminal, of a series of successive tracking data each associated with time stamp information, so as to enable reconstruction of a route followed by the terminal.

14 Claims, 4 Drawing Sheets

TRACEABILITY METHOD FOR AN ELECTRONIC PAYMENT TERMINAL IN THE EVENT OF A THEFT THEREOF, AND CORRESPONDING COMPUTER PROGRAM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

This disclosure relates to the field of electronic payment terminals, and more precisely portable or mobile payment terminals.

More particularly, the disclosure relates to the fight against the theft and concealment of such stolen terminals.

BACKGROUND OF THE DISCLOSURE

Electronic payment terminals can be found deployed in groups, or forming a "community," in stores, supermarkets, restaurants, etc.

In some cases, these terminals are stationary, i.e., connected to a base, for example, and therefore difficult to steal.

However, for user-friendliness reasons, mobile or portable terminals are frequently deployed, e.g., in restaurants, in order to prevent the client from moving when making their payment by bank card. Their small size and autonomy render the monitoring thereof difficult (e.g., by human means, or video surveillance means).

One disadvantage of these mobile terminals is that they are thus highly susceptible to theft.

1. Prior Art

In the event of theft, the owner of the terminal makes a statement to the law enforcement authorities.

The terminal may then be retrieved by the police, a relatively long time after the theft. However, the distance from the place of the crime and particular conditions, such as the alteration of serial numbers, can make it difficult for the law enforcement authorities to make a correlation between a theft and the device retrieved. For example, a terminal may be retrieved several thousand kilometres from the location of the theft, several months thereafter.

Consequently, the law enforcement authorities are often unable to restore it to the rightful owner thereof.

SUMMARY

An aspect of the disclosure relates to a traceability method for an electronic payment terminal, in the event of a theft thereof, comprising the following steps:
  detection of a lack of contact with a base and/or another terminal associated with said terminal, for a predetermined time span, generating a passage of said terminal into a stolen state;
  in said stolen state, storage, in a secure memory area of the terminal, of a series of successive tracking data each associated with time stamp information, so as to enable reconstruction of a route followed by said terminal.

The step of detecting the theft takes into account, for example, an impossibility for the terminal to enter into contact with the base thereof or with at least one other terminal of the same fleet, during a predetermined time span.

In this case, it decides, on its own, to securely store information which can be used later, in particular by law enforcement authorities, in order to know, at least roughly, the path followed by the terminal and therefore the thief.

In other words, for investigative purposes, a history of the terminal is stored from the moment when the theft was detected.

Thus, in said stolen state, the method provides in particular, a step of storing a series of successive tracking data, each associated with time stamp information.

As a matter of fact, when the terminal is retrieved, the law enforcement authorities, or more generally any authorised third party, will be able to reconstruct the route followed, based on the tracking information (e.g., cell identifiers of a GSM network) over time (e.g., by storing the GSM cell changeover or "handover" moments). This information and, if need be, other theft circumstance-related information, can make it easier to locate the rightful owner of the terminal, and/or to more easily expose the thieves.

In various embodiments, the method provides for at least one of the following steps, after the terminal has passed into the stolen state:
  a step of deleting sensitive data (memory area wherein card-related information is stored, for example);
  a step of invalidating the terminal;
  a step of triggering an alarm (telephone call (voice message, SMS, . . . ) towards law enforcement authorities or an audible alarm . . . ).

According to an embodiment of the disclosure, said tracking data can come from various types of transmitters. In particular, said tracking data can comprise identification data for a radio communication network base station with which said terminal is connected at a given moment.

For example, this may involve the identification of the closest GSM base at said given moment.

For example, the terminal can periodically record the current location of the closest GSM base and the date and/or time of this location, thereby enabling investigators to discover a posteriori the route of the stolen terminal.

This recording can likewise be carried out upon each detection of a cell changeover ("handover").

In other embodiments, said tracking data can comprise tracking data coming from transmitters of other types of radio communications. For example, this may involve tracking data coming from a radio telephone transmitter, such as an IS-41 transmitter, from a Wifi terminal and/or an FM transmitter delivering RDS messages, or else tracking signals, e.g., of the GPS type.

The method can likewise provide for some tracking data to come from a transmitter associated with a community of wireless terminals (other than the one to which the terminal belonged), e.g., such as the base of another fleet of payment terminals.

In this particular case, it is possible for this base to be able to recognise the presence of a stolen terminal nearby and, if need be, to transmit an alert signal to an authorised third party.

Of course, the types of tracking data sources can be many, and vary over the course of acquisitions, based on the vicinity of the terminal, for example. It is understood that the higher the number of "reference points" obtained, the higher the accuracy of the reconstructed path.

According to an embodiment of the disclosure, the method likewise comprises the recording of at least one data item representative of the theft and/or of the context thereof in a secure memory area of the terminal.

In a stolen state, the method can thus implement a step of storing, in a secure memory area of the terminal, at least one piece of information relating to at least one last transaction conducted by said terminal prior to or during its passage into the stolen state.

In some particular embodiments, the elements recorded in the secure memory area of the terminal make it possible, in particular, to characterise the moment when the theft was detected. They can comprise, in particular, the date and/or the time of detection, and the reason for the detection.

Thus, according to the embodiments, in the stolen state, the method can likewise comprise, a step of storing, in a secure memory area of the terminal, at least one piece of information relating to a time stamp of the theft.

In some particular embodiments, in the stolen state, the method provides for a step of storing, in a secure memory area of the terminal, at least one piece of information relating to the nature of the theft.

For example, at least one of said pieces of information relating to the nature of the theft belongs to the group comprising:
an identification of the merchant;
an address for the merchant;
a telephone number for a person to be contacted;
a serial number for a master base of origin of the terminal;
an identification information for the manufacturer or for a manager of said terminal.

In the stolen state, the method can further implement a step of storing, in a secure memory area of the terminal, at least one piece of information relating to an action carried out by said terminal, at least one later moment after said detection.

In particular, this may involve storing each operation carried out on the terminal, thereby helping to identify the offenders' intentions.

Thus, an aspect of the disclosure proposes a novel and inventive approach to the fight against the theft of payment terminals and the concealment thereof, which limits the possibilities of offenders' injury and likewise assists in remedying the theft committed.

Some embodiments provide for the method to comprise, in the stolen state, a periodic transmission step, transmitting at least one of the stored pieces of information to a controlling third party.

According to an embodiment of the disclosure, this controlling third party may, for example, be a law enforcement agency, a banking institution, the owner of or a person responsible for the terminal.

In one exemplary embodiment of the disclosure, the method likewise comprises a step of delivering said representative data to a third party, comprising a sub-step of verifying the authority thereof.

This delivery can be carried out locally (display device, speech synthesis, printing, copying to a USB flash drive) or remotely, by downloading.

An aspect of the disclosure likewise relates to a computer program product that can be downloaded from a communication network and/or recorded on a machine- readable medium and/or executed by a processor, comprising program code instructions for implementing the traceability method for electronic terminals, in the event of a theft, as described previously.

An aspect of the disclosure further relates to a terminal suitable for implementing the method. A terminal such as this comprises, in particular:
a means of detecting a lack of contact with a base and/or another terminal associated with said terminal for a predetermined time span, generating a passage of said terminal into a stolen state;
in said stolen state, a means of storing, in a secure memory area of the terminal, of a series of successive tracking data each associated with time stamp information, so as to enable reconstruction of a route followed by said terminal.

A terminal according to an aspect of the disclosure can likewise comprise:
means of defining (parametering) data to be stored in the event of a theft;
means of detecting the theft by the lack of response from the base or another identified terminal;
a microprocessor gathering the information to be recorded;
a secure memory card of sufficient capacity to record the context elements;
a means of transmitting and/or restoring stored data.

In one particular embodiment of the disclosure, the terminal comprises a period transmission means, transmitting at least one of the stored pieces of information to a controlling third party.

Finally, the disclosure relates to a base of a fleet of payment terminals which comprises means of detecting the presence of a payment terminal foreign to its fleet and means of transmitting data associated with its own location to said foreign terminal.

A base such as this can likewise comprise means of receiving said information transmitted by said foreign terminal, and means of transmitting to said third parties said information transmitted by said foreign terminal.

BRIEF DESCRIPTION OF THE DRAWINGS

Other characteristics and advantages will become more apparent from the following description of an embodiment, given for purely illustrative and non-limiting examples, and from the appended drawings, among which.

DETAILED DESCRIPTION OF ILLUSTRATIVE EMBODIMENTS

1. General Principle

The general principle of an aspect of the disclosure is based on the implementation of a recording of data representative of a theft of an electronic payment terminal, and, in particular, the path followed after the theft (at least for an initial time period, if the electrical power supply is missing), in a secure memory area of the terminal, so as to enable analysis of the circumstances of the theft (date and time, location, owner, . . . ) and/or reconstruction of the route followed by the terminal (owing to the storing of successive location data for the terminal and to the time stamping thereof), if the terminal is later retrieved.

2. Description of a particular embodiment

Reference is made herein below to an exemplary implementation of the method, which is applied to a mobile payment terminal, for the purpose of making easier the search for the owner thereof and of helping to expose the thief, if the terminal is stolen and then retrieved, e.g., by a law enforcement agency.

Figure 1:
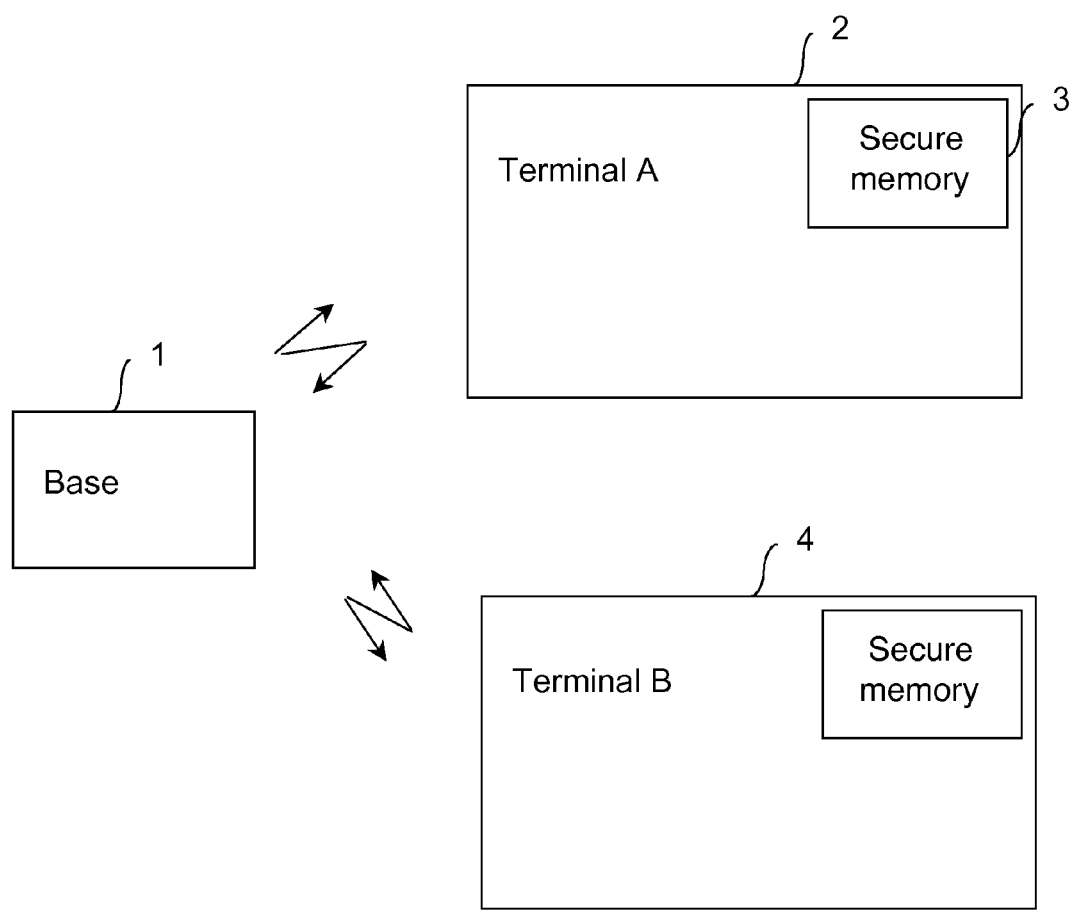
FIG. 1 shows a functional block diagram of one embodiment.

One particular mode of implementation is presented in relation to FIG. 1, which is implemented in a payment terminal 2 forming part of a fleet of mobile terminals 2, 4, which are used, for example, in a restaurant, and deployed around a "master" base 1.

The terminal 2 comprises means of interacting with the base 1 and possibly with another terminal 4 of the same fleet. The terminal 2 likewise comprises a central processing and control unit (microprocessor) which is able to read data situated, in particular, in a volatile memory area of the terminal 2, and of storing data, in particular in a secure memory area 3 of the terminal 2.

In this particular embodiment, the microprocessor of the terminal 2 is likewise able to delete data from the volatile memory thereof and also comprises a GSM communication transmitter. It is further able to produce an alarm (audible or telephonic) in order to bring attention to the theft. These features are optional.

Finally, the terminal comprises a means of restoring the previously stored data.

Figure 2:
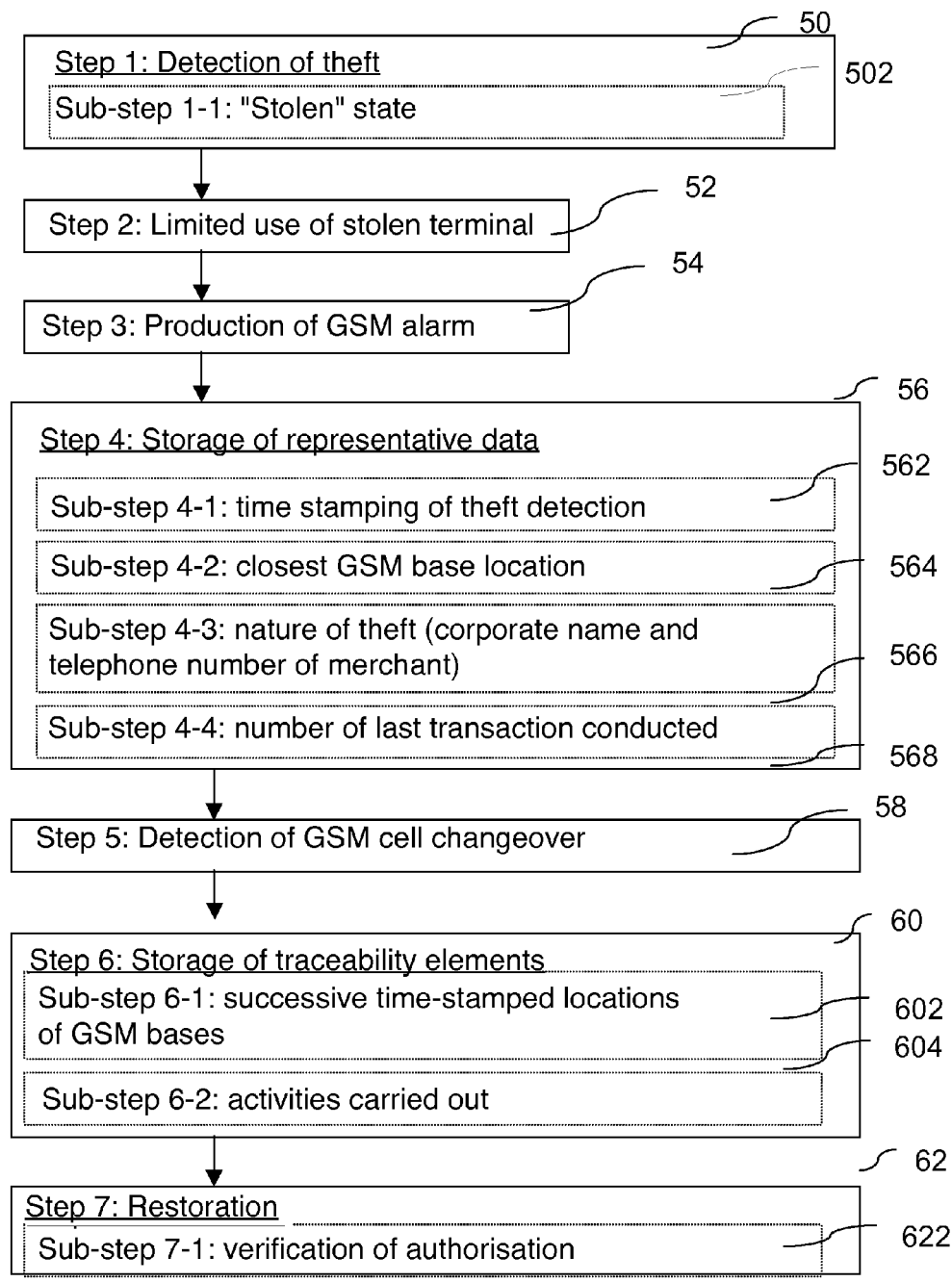
FIG. 2 shows the dynamic operation, based on the static block diagram of FIG. 1.

The principal steps of the method will now be presented in relation with FIG. 2, for one of the terminals, which, in this case is terminal 2 (as the fleet of restaurant terminals can be heterogeneous, no assumption is made about implementing the method for all of the terminals of the fleet).

The first step of the method, for example, comes into play when the terminal 2 no longer succeeds in interacting with the base 1 thereof, or with another terminal 4 of the fleet, over a predetermined time span. This is the step of detecting the theft 50, which results in the terminal passing into the stolen state.

In the particular embodiment described here, the method thus provides for a sub-step of passing from the in-house state of the terminal to a so-called "stolen state" 502.

In this embodiment, a second step is provided for limiting the possibilities for use of the stolen terminal 52: deletion of sensitive data, such as that containing data relating to payments already made for example, and triggering of a mechanism for invalidating the terminal.

A third step of this embodiment is the production of an alarm, e.g., via GSM, to the law enforcement authorities or the like 54.

The method comprises a fourth step of storing data in the secure memory 56, which is representative of the theft and of the context thereof.

This step 56 comprises itself several sub-steps, as a function of the data to be stored. In this particular form of embodiment, the following sub-steps are identified:

a sub-step of storing the theft detection time stamp 562,
  a sub-step of obtaining and storing the position of the GSM base closest to the terminal during detection of the theft 564,
  a sub-step of storing data relating to the nature of the theft: identification of the merchant and telephone number of a contact person 566,
  a sub-step of storing the number of the last transaction conducted from the terminal prior to or during detection of the theft 568.

In some embodiments, this last sub-step can likewise comprise the storage of other information relating to this transaction, e.g., such as the amount of the transaction or the account number being debited and/or credited.

The order of the steps or sub-steps can, of course, be modified.

It is also possible to provide for the rightful owner to have the option of interrupting the procedure, e.g., by presenting a secret code making it possible to prove that the terminal was not stolen.

When the in-house state of the terminal is passed off as stolen, the terminal 2 then operates differently.

On the one hand, the method provides for a step of detecting 58 a shift, or a movement, e.g., in the form of a GSM cell change or a similar cellular system ("handover") and/or a periodic acquisition of a an identifier of the closest GSM base station, as long as the terminal 2 has a sufficient amount of power.

On the other hand, the data relating to the history of the terminal after the theft 60 is stored. For example, the successive locations of the closest GSM station 602 are stored in the secure memory 3, as well as the corresponding date and time. In particular, upon each cell change, the terminal is able to store the location of the new base station and the time stamp thereof, in order to be able to subsequently retrace the terminal's route.

Any activity detected on the terminal 2 (e.g., insertion of a payment card) can likewise be stored 604 in the secure memory 3.

If the terminal 2 is shut off and then restarted, it can once again immediately begin to record its GSM position as well as the activities carried out by the user. It is likewise possible, even when turned off, for a portion of the terminal to remain powered up, in order to make it possible to discreetly (i.e., undetected by the thief) record the various pieces of information in the terminal.

Finally, provisions are made for a step of restoring 62 representative data stored in the secure memory 3 of the terminal 2, when the terminal 2 is retrieved by law enforcement authorities. This step comprises a sub-step of verifying authorisation 622.

Figure 3:
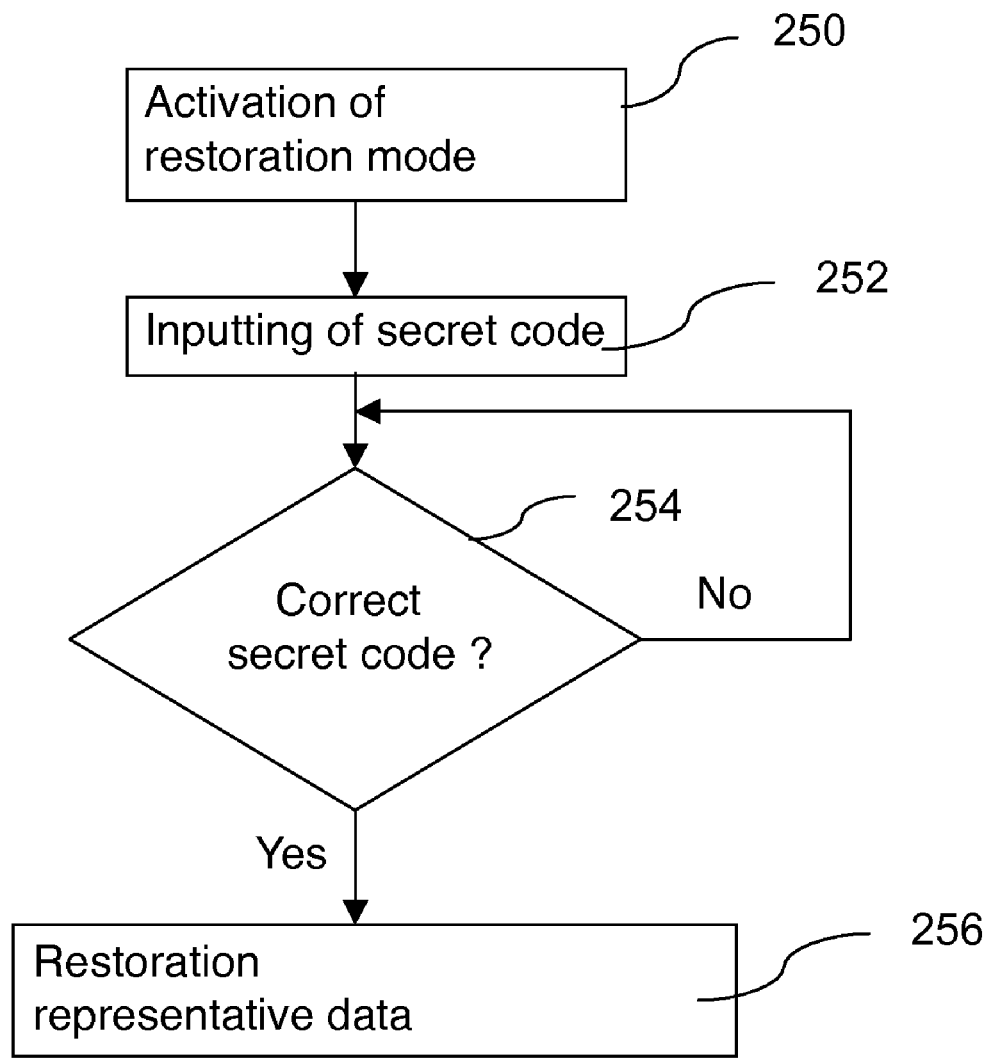
FIG. 3, which is based on the block diagram presented in FIG. 1, shows the dynamic operation for restoring stored representative data.

In the embodiment shown in FIG. 3, activation of the "restoration" mode 250, followed by inputting of the secret code 252 (provided by an authorised official), makes it possible to restore 256 information stored in the secure memory 3, if the secret code is correct 254. This restoration can be carried out locally, e.g., by using a USB flash drive, or by means of a display device, speech synthesis or printing. It can also be carried out remotely, by downloading.

In an alternative to the embodiment described, the terminal can periodically transmit some stored information. For example, the method can provide for transmission of all or part of the successively recorded tracking information for the closest GSM bases, and the corresponding tracking dates and/or times, to a controlling third party, e.g., such as a law enforcement agency or another payment terminal base, in order to determine the location of the terminal.

Figure 4:
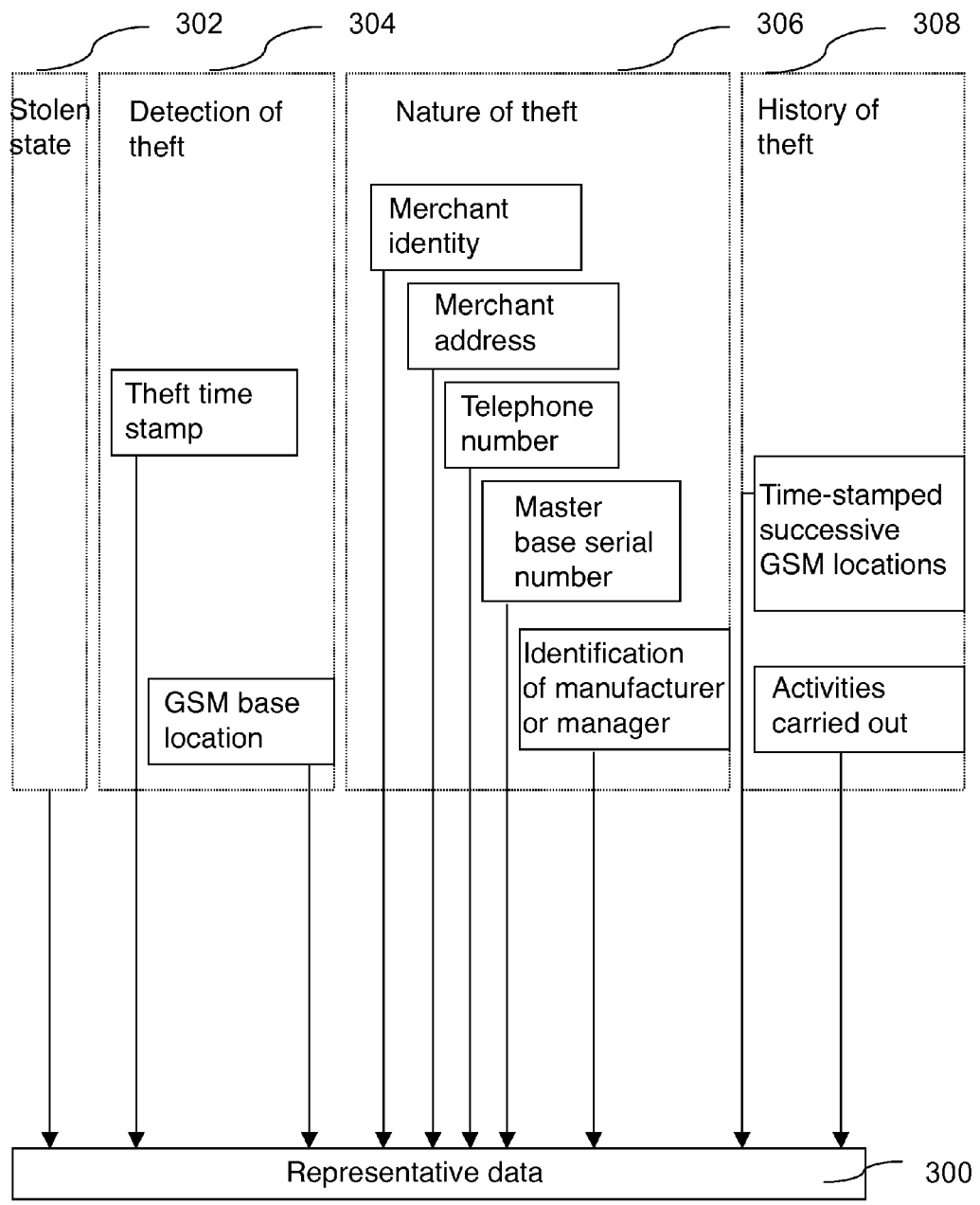
FIG. 4, which is based on the block diagram presented in FIG. 1, shows a type of stored representative data according to an aspect of the disclosure.

FIG. 4 shows an example of representative data 300 able to be stored according to the method: the "stolen" state of the terminal 302 (which prevents the re-use of the terminal), data providing details concerning the theft detection period 304 (date and/or time of the detection and/or location of the closest GSM base, for example), data relating to the context of the theft 306 (identification of the merchant, address of the merchant, telephone number of a contact person, serial number of the master base of origin of the terminal, identification information for the manufacturer and or a manager of the terminal, for example), or data providing details about the history of the theft 308 (successive locations of the closest GSM base station and corresponding location dates and/or times, or identification of the activities carried out on the terminal, for example).

In one particular form of embodiment of this variant of the disclosure, the master base 1 of the fleet of terminals is able to receive messages transmitted by a terminal similar to terminal 2 but foreign to the fleet of payment terminals with which the base and terminal 2 are associated.

When the base receives a message transmitted by such a "foreign" terminal, it then supplies the terminal with data relating to its own location (or an identifier of this base), so that it might record it. This base can further transmit an alert message to a controlling third party recipient, indicating that it is in the presence of a "foreign" terminal. This alert message may comprise all or part of the data stored by the stolen terminal. In particular, this may involve a telephone, SMS or e-mail message, etc., to the controlling third party or another authorised third party, e.g., such as a banking supervisory authority, the owner of the fleet of terminals or law enforcement authorities.

An aspect of the disclosure assists investigators in better characterising a payment terminal theft.

In particular, an aspect of the disclosure assists investigators in finding the owner of a stolen mobile terminal.

An aspect of the disclosure assists investigators in exposing the offenders.

A further aspect of the disclosure provides such a technique which is simple to implement and inexpensive in some embodiments.

Although the present disclosure has been described with reference to one or more examples, workers skilled in the art will recognize that changes may be made in form and detail without departing from the scope of the disclosure and/or the appended claims.

What is claimed is:

1. A traceability method, comprising the following steps:
   detection of a lack of contact of a first electronic payment terminal with a base and/or a second electronic payment terminal associated with said first electronic payment terminal, in the event of a theft thereof, for a predetermined time span, generating a passage of said first electronic payment terminal into a stolen state; and
   in said stolen state, storage, in a secure memory area of the first electronic payment terminal, of a series of successive tracking data each associated with time stamp information, so as to enable reconstruction of a route followed by said first electronic payment terminal.

2. The traceability method of claim 1, wherein said tracking data comprise identification data for a radio communication network base station with which said first electronic payment terminal is connected at a given moment.

3. The traceability method of claim 1, wherein, in said stolen state, the method comprises a step of storing, in a secure memory area of the first electronic payment terminal, at least one piece of information relating to at least one last transaction conducted by said first electronic payment terminal prior to or during its passage into the stolen state.

4. The traceability method of claim 1, wherein, in said stolen state, the method comprises a step of storing, in a secure memory area of the first electronic payment terminal, at least one piece of information relating to a time stamp of the theft.

5. The traceability method of claim 1, wherein, in said stolen state, the method comprises a step of storing, in a secure memory area of the first electronic payment terminal, at least one piece of information relating to a nature of the theft.

6. The traceability method of claim 5, wherein at least one of said pieces of information relating to the nature of the theft belongs to the group comprising:
   an identification of a merchant;
   an address for the merchant;
   a telephone number for a person to be contacted;
   a serial number for a master base of origin of the first electronic payment terminal;
   an identification information for a manufacturer or for a manager of said first electronic payment terminal.

7. The traceability method of claim 1, wherein, in said stolen state, the method comprises a step of storing, in a secure memory area of the first electronic payment terminal, at least one piece of information relating to an action carried out on said first electronic payment terminal at least one later moment after said detection.

8. The traceability method of claim 1, wherein, in said stolen state, the method comprises a periodic transmission step, transmitting at least one of the stored pieces of information to a controlling third party.

9. The traceability method of claim 1, wherein the method comprises a step of delivering said representative data to a third party, comprising a sub-step for verifying authorisation thereof.

10. A computer program product recorded on a machine-readable medium and executable by a processor, wherein the product contains program code instructions for implementing a traceability method comprising the following steps:
    detection of a lack of contact of a first electronic payment terminal with a base and/or a second electronic payment terminal associated with said first electronic payment terminal, in the event of a theft thereof, for a predetermined time span, generating a passage of said first electronic payment terminal into a stolen state;
    in said stolen state, storage, in a secure memory area of the first electronic payment terminal, of a series of successive tracking data each associated with time stamp information, so as to enable reconstruction of a route followed by said first electronic payment terminal.

11. A payment terminal comprising:
    means of detecting a lack of contact with a base and/or another payment terminal associated with said payment terminal, for a predetermined time span, generating passage of said payment terminal into a stolen state; and
    in said stolen state, a means of storing, in a secure memory area of the payment terminal, of a series of successive tracking data each associated with time stamp information, so as to enable reconstruction of a route followed by said payment terminal.

12. The payment terminal of claim 11, wherein the terminal comprises a periodic transmission means, transmitting at least one of the stored pieces of information to a controlling third party.

13. A base of a fleet of payment terminals, wherein the base includes means for detecting presence of a payment terminal as claimed in claim 12 and foreign to its fleet and means for transmitting data associated with the base's own location to said foreign terminal.

14. The base of claim 13, wherein the base comprises means for receiving said information transmitted by said foreign terminal, and means for transmitting to a third party said information transmitted by said foreign terminal.

* * * * *